United States Patent [19]

Schneider et al.

[11] Patent Number: 4,774,213
[45] Date of Patent: Sep. 27, 1988

[54] FERRUGINOUS CATALYST FOR DECREASING THE CONTENT OF NITROGEN OXIDES IN FLUE GASES

[75] Inventors: Michael Schneider, Ottobrunn-Riemerling; Karl Kochloefl, Bruckmuhl/Heufeld; Gerd Maletz, Landshut; Hans J. Wernicke, Geretsried, all of Fed. Rep. of Germany

[73] Assignee: Sud-Chemie Aktiengesellschaft, Munich, Fed. Rep. of Germany

[21] Appl. No.: 940,361

[22] Filed: Dec. 11, 1986

[30] Foreign Application Priority Data

Dec. 16, 1985 [DE] Fed. Rep. of Germany ....... 3544476

[51] Int. Cl.$^4$ .......................... B01J 20/12; B01J 21/16
[52] U.S. Cl. ......................................... 502/81; 502/84
[58] Field of Search ................................... 502/81–84; 423/239

[56] References Cited

U.S. PATENT DOCUMENTS

| 4,665,044 | 5/1987 | Pinnavaia et al. | 502/84 |
| 4,692,425 | 9/1987 | Schneider et al. | 502/81 |

FOREIGN PATENT DOCUMENTS

| 2458888 | 6/1975 | Fed. Rep. of Germany . | |
| 2371961 | 7/1978 | France | 502/84 |
| 81774 | 7/1976 | Japan | 502/84 |
| 9677 | 1/1977 | Japan | 423/239 A |
| 39590 | 3/1977 | Japan | 502/84 |
| 112274 | 9/1978 | Japan | 502/83 |
| 66377 | 5/1979 | Japan | 423/239 |

*Primary Examiner*—Carl F. Dees
*Attorney, Agent, or Firm*—Sprung Horn Kramer & Woods

[57] ABSTRACT

A ferruginous catalyst for decreasing the content of nitrogen oxide in flue gases. The catalyst comprising an active constituent in the form of a combination of a compound of iron and of an acid aluminosilicate that has a layered structure.

17 Claims, No Drawings

FERRUGINOUS CATALYST FOR DECREASING THE CONTENT OF NITROGEN OXIDES IN FLUE GASES

BACKGROUND OF THE INVENTION

1. Field of the Invention

The invention concerns a ferruginous catalyst for decreasing the content of nitrogen oxides in flue gases.

2. Background Information

Nitrogen oxides ($NO_x$) are generated both from the nitrogenous constituents of the fuel and from the nitrogen in the air when fossil fuels are burned. The oxides enter the atmosphere and become extremely detrimental to the environment. Nitrogen oxides are considered partly responsible for the destruction of forests by "acid rain", and the formation of "photochemical smog" is in particular ascribed to nitrogen oxides.

There exists, due to the constant increase in $NO_x$ emissions in recent years, a high level of interest in decreasing the content of $NO_x$ in flue gases.

It is known that nitrogen oxides can be converted into $N_2$ and $H_2O$ by $NH_3$ and that the reaction is fairly selective over a wide range of temperatures, meaning that, since it proceeds in the presence of a high excess of oxygen (as is usual in flue gases) without excessive loss of ammonia as the result of oxidation, only relatively small amounts of reductants are necessary. Various catalysts for reducing $NO_x$ with ammonia are also known.

The catalytically active constituents of these known $NO_x$-reduction catalysts are mainly toxic heavy-metal compounds. Thus, German Pat. No. 2 458 888 specifies a combination of titanium dioxide with oxides of the metals vanadium, molybdenum, tungsten, nickel, cobalt, uranium, etc. Since the action of the nitrogen-decreasing catalysts constantly loses its effectiveness the longer the processing continues under the operating conditions typical of this field of application, they must be replaced after about two to five years. The no longer usable catalysts, which contain high levels of toxic constituents, must then be expensively regenerated or disposed of subject to strict controls. Given the huge amounts of catalyst required for, say, decreasing the nitrogen content of power-plant flue gases, the risk of secondary environmental damage is obvious.

The use of molecular sieves to catalyze $NO_x$ reduction with $NH_3$ is also known. German OS No. 3 000 383, for example, employs a clinoptilolith in the form of hydrogen as a catalyst. The form is obtained by ion exchange of a naturally occurring clinoptilolith with a solution of ammonium nitrate and washing with a powerful acid.

German OS No. 3 328 653 specifies a catalyst consisting of a ceramic molecular sieve with permeability cross-sections that have diameters ranging from shorter than the critical molecular diameter of ammonia to longer than that of nitrogen.

The catalytic action of these molecular-sieve catalysts is accordingly determined by their pore structures. The catalysts entail the risk of damage to crystalline structure at high reaction temperatures due to the effect of the water vapor present in high concentration in the flue gases, whereas at low temperatures the ready absorption of the vapor leads to decreased activity. An especially serious drawback to molecular sieves like H-mordenite and H-clinoptilolite is the formation of considerable concentrations of undesirable $N_2O$, as known, for example, from the research of J. R. Kiovsky, P. B. Koradla, and C. T. Lin, *Ind. Eng. Chem. Prod. Res. Dev.*, (1980), 218.

A similar reduction catalyst for removing nitrogen oxides from flue gases is known from German AS No. 2 446 006. It consists of an aluminum-silicate hydrate containing 1 to 10% alkali or alkaline-earth oxide, of, that is, a synthetic zeolite, as a carrier, and of a salt, oxide, or hydroxide of iron as a catalytic constituent. This catalyst is, due to its high content of alkali or alkaline earth, not very resistant to sulfur.

The use of iron oxide as a catalyst for the reduction of $NO_x$ is known from German Pat. No. 2 621 944, which employs iron ore with a particle size of 3 to 35 mm. The used catalyst is continuously removed and transferred to a blast furnace for use as a raw material in iron production. This catalyst is inappropriate for stationary-bed reactors because it leads to unacceptably high pressure loss.

German Pat. No. 2 460 681 also specifies an iron-oxide reduction catalyst, obtained by magnetic precipitation from blast-furnace dusts, sintering-plant dust, etc. Its relatively short life is especially undesirable considering that replacing a charge of catalyst is very time-consuming and expensive.

It is also known, from German Pat. No. 2 619 662, that $Fe_2O_3$ obtained from alpha-goethite by thermal dehydration will catalyze $NO_x$ reduction. The only appropriate starting material, of course, is of course this oxide-hydrate modification, and the resulting iron oxide has a very weak action. Furthermore, according to German Pat. No. 2 639 848, hematite obtained from goethite will only exhibit sufficient catalytic action when the ratio of reflex intensities obtained by X-ray diffraction at specific planes in the crystal lattice exceeds a prescribed level.

German Pat. No. 2 525 880 specifies a porous catalyst for removing nitrogen oxides that consists of iron oxide or iron sulfate as active constituents and of a $SiO_2$-$Al_2O_3$ carrier with a $SiO_2$ content of at least 60% and a porosity that includes at least 0.15 ml/g with pores greater than 15 nm. The obvious drawback to this catalyst is that the carrier must be produced subject to precisely maintained conditions from, say, a solution of $Al(SO_4)_3$ and a hydrogel of $SiO_2$ by neutralization with $NH_3$, which is an expensive method.

German OS No. 2 784 471 specifies a catalyst paste for use in the vapor-phase reduction of nitrogen oxides with ammonia. The paste contains iron oxide on a shaped carrier made out of titanium dioxide and a clay mineral with a mean particle size of 0.1 to 100 $\mu$m. The clay mineral acts as a binder for the titanium-dioxide particles and is intended to accordingly improve the catalyst's crush strength. The clay mineral has no catalytic action. The catalytic action is primarily ascribed to an interaction between the iron oxide and the titanium dioxide.

German OS No. 2 504 027 specifies a method for selectively reducing nitrogen oxides in flue gases that, in addition to nitrogen oxides, also contain sulfur oxides in the presence of a catalyst that contains iron sulfate on a carrier, with ammonia employed as a reducing agent. The carriers are preferably inert refractory carriers like aluminum oxide, cordierite, and mullite, that do not enter into a catalytic interaction with the iron sulfate. The presence of iron sulfate is considered essential because iron nitrate, for example, results in useless catalysts.

The object of the prior pending application U.S. Ser. No. 880,168 is a catalyst for decreasing the nitrogen-oxide content of flue gases that contains an active constituent in the form of an acid aluminosilicate with a layered structure. A catalyst of this type, which can be obtained by, among other methods, treating appropriate starting materials that contain layer silicates with aqueous mineral acid, is very active in reducing nitrogen oxides to $H_2O$ and $N_2$ with ammonia.

SUMMARY OF THE INVENTION

The object of the present invention is to provide a catalyst that is not only very active in decreasing the content of nitrogen oxide in flue gases, but contains no environmentally deleterious constituents and can be manufactured in large quantities from inexpensive starting materials. The expensive catalyst constituent titanium dioxide is in particular to be avoided.

This object can, surprisingly, be attained with a ferruginous catalyst characterized in that it contains an active constituent in the form of a combination of a compound of iron and of an acid aluminosilicate that has a layered structure. Such catalyst exhibits a definitely more powerful catalytic action than either the acid aluminosilicate or the iron compound alone.

Although no unambiguous mechanistic explanation can be provided at the present time for this synergistic interaction, the presence of the silicatic layered structure does seem to be a necessary prerequisite. The steric and electrostatic relations between the spaces between the layers are evidently modified by the presence of the iron compound in such a way that the $NH_3$ is adsorbed at a bonding strength that promotes the rest of the catalytic process. If, in fact, either a conventional $SiO_2$-$Al_2O_3$ carrier with an appropriate BET surface or a layer silicate with a crystalline structure that has been destroyed by high-temperature treatment is employed instead of the acid layer silicate in accordance with the invention in the reaction with the iron compound, the catalytic action will be definitely decreased.

The same is true when the layer silicate and iron compound are only mixed mechanically, meaning that the iron does not chemically bind to the layer-silicate lattice. In this case, the addition of the iron compound does not significantly increase the catalytic action of the layer silicate.

DETAILED DESCRIPTION OF THE INVENTION

The high ion-exchange capacity of the aluminosilicate with a layered structure employed in accordance with the invention to manufacture the active constituents also allows optimum distribution of the iron throughout its crystal lattice, so that even very low concentrations of iron are sufficient to obtain a powerful catalytic action. What is surprising is that such a powerful catalytic action also results even though the catalysts in accordance with the invention contain no or very little (less than 5% and preferably less than 1%) titanium, in contrast to commercially conventional catalysts.

Acid aluminosilicates with a layered structure should, for example, be understood as meaning those of the smectite type and especially of the montmorillonite type. In addition to natural acid aluminosilicates like the Fuller's earths and Japanese acid clays, synthetic products obtained by the acid treatment of natural neutral aluminosilicates with a layered structure are employed. The latter can be obtained by treating a neutral starting material that contains a layer silicate with aqueous acids, especially mineral acids while decreasing the content of intermediate-layer cations.

The acid treatment for converting the neutral starting materials that contain layer silicate into "acid" aluminosilicates can be carried out in accordance with a method that is in itself known, preferably employing aqueous mineral acids like hydrochloric or sulfuric acid. Organic acids like formic an acetic acid can, however, also be employed. The acid concentration generally ranges from 1 to 60% and preferably from 10 to 40% by weight in terms of the solids content. A preliminary wet classification of the raw material can also be an advantage.

The atomic ratio of the silicon in the acid aluminosilicate to the iron ranges from 0.07 to 90 and preferably from 2 to 50.

The acid aluminosilicate is preferably an acid-activated three-layer silicate that partly retains its crystalline layered structure and has a BET surface that is increased by at least 15% and preferably by at least 50% beyond that of the three-layer silicate before acid activation, the three-layer silicate having a cation-exchange capacity of 30 mval/100 g or more before acid activation (mval=milliequivalents).

The concentration of intermediate-layer cations that results from acid activation is preferably at least 12% lower than that in the three-layer silicate before acid activation, and the content of $SiO_2$ at least 5% and preferably at least 10% higher than that of the starting material.

The percentage of pore volume devoted to macropores with a diameter greater than 80 mm is preferably at least 25%.

Employed as starting materials for the iron compound are the iron oxides or sulfates themselves as well as materials that contain them or can be converted into iron oxides and sulfate by methods that are in themselves known. Examples include metallic iron, iron oxides like FeO, $Fe_2O_3$, hydroxides and oxide hydrates like $Fe(OH)_2$, $Fe(OH)_3$, and FeO(OH), and iron salts like the halides, carbonates, nitrates, and sulfates. Especially appropriate as starting materials in view of their low raw-material costs are iron ores, scrap iron, processing residue from the metals industry, and used ferruginous catalyst pastes of the type employed for the high-temperature conversion of carbon monoxide.

The iron compound is combined with the layer silicate into a catalytically active paste by, for example, thoroughly mixing the acid aluminosilicate with a layered structure with one or more oxides and/or sulfates of iron or compounds that can be converted into them. The iron compound can be employed in the form of a solid, liquid (carbonyles e.g.) or solution. If the iron compound is employed in the solid form, as an iron oxide, for example, it is usually calcined to create chemical bonds between the iron compound and the layer-silicate lattice.

The catalyst in accordance with the invention can also be obtained by impregnating the acid aluminosilicate with a solution of the iron compound, an iron salt for example, and of a complex compound, followed by calcination. The calcination converts the starting materials into the oxide form. The iron compounds can, however, also be converted into the sulfates by treating them with sulfuric acid or sulfur oxides. Complete or incomplete conversion into the sulfates can also occur during the use of the catalyst in accordance with the invention subject to the action of the sulfur oxides normally present in flue gases. Chemical bonds between the iron compounds and the layer-silicate lattice are also formed in this case.

If the iron compound, a hydroxide, for instance, employed in the reaction with the layer silicate is obtained by precipitation, the precipitation can occur from a solution of the iron salt in the presence of a suspension of the acid aluminosilicate. The resulting foreign ions (ammonium ions and sulfate ions, e.g., if the iron salt is iron sulfate and the precipitant is ammonia) are washed out and the precipitate dried and calcined.

In one variant of this method of manufacture that is especially practical with highly ferruginous aluminosilicates with a layered structure, the ferruginous decomposition solution that derives from decomposing the layer silicate can be employed as a source for the iron compound. Thus, acid decomposition is carried out and iron hydroxide is precipitated out of the acid decomposition solution in the presence of the layer silicate by neutralization. The precipitate is then again freed of foreign ions by washing and calcined.

The catalyst in accordance with the invention can also be manufactured by means of an ion-exchange reaction between a solution of an iron compound and the acid aluminosilicate with a layered structure. It can be practical to carry out the preliminary acid treatment in such a way that the concentration of intermediate-layer cations decreases only gradually. The ion-exchange reaction can also be carried out with the neutral starting material that contains the layer silicate, with the acid treatment not occurring until later.

The catalyst in accordance with the invention is usually present in the form of a compact material, meaning that no inert carrier is employed. The catalyst is usually present in the form of molded shapes, especially balls, tablets, extruded shapes, elongated or flat honeycombs (called "channel grids"), rods, tubes, rings, wagon wheels, or saddles.

The shapes can be obtained, for example, by tableting or extruding the catalyst paste, with additives also mixed in if necessary to facilitate shaping. Such additives include, for example, graphite and aluminum stearate. Additives to improve the surface structure can also be mixed in. These include, for example, organic substances that will burn up and leave a porous structure during the subsequent calcination.

It is not absolutely necessary to employ additives to facilitate shaping because the three-layer silicate that is employed as a starting material is plastically deformable even when intimately mixed with the metal constituents. Neutral bentonites or other binders like kaolin or cement can, however, also be added. The material is generally shaped with water or organic solvents like monovalent or polyvalent alcohols, polyethylene oxide, or various polysaccharides added.

The catalyst paste, the combination of the acid layer silicate and the iron compound that is, is usually subjected to shaping. It is, however, also possible to shape the starting material that contains the layer silicate before or after acid treatment and then carry out the reaction with the iron constituents.

The catalysts in accordance with the invention are usually dried after being shaped, and calcined at temperatures of about 200° to 700° C. and preferably 300° to 550° C.

Calcination activates the catalyst, which accordingly obtains its practical properties, especially if the aforesaid temperature ranges are maintained.

The examples specify typical procedures for manufacturing the catalysts in accordance with the invention.

Another object of the invention is the use of the catalysts in accordance with the invention for reductively decreasing the content of nitrogen oxide in flue gases that contain, in addition to the usual constituents, sulfur oxides ($SO_x$), whereby $NH_3$ is employed as a reductant.

In reducing with $NH_3$, the content of nitrogen oxides in the flue gases is decreased due to the formation of $N_2$ and $H_2O$. Although nitrogen oxides ($NO_x$) are any compound of nitrogen and oxygen like NO, $N_2O_3$, $NO_2$, and $N_2O_5$, the most important nitrogen oxides in the present context are NO and $NO_2$, mainly the former.

The concentration of $NO_x$ in the flue gases that are to be cleaned can vary widely, generally ranging from 100 ppm by volume to 5% by volume. The molar ratio of $NH_3$ to $NO_x$ is generally 0.3 to 3, preferably 0.6 to 1.5, and can be regulated by controls technology to obtain maximum $NO_x$ conversion at the minimum possible $NH_3$ slippage. The $NH_3$ can be added either in the form of a gas or in an aqueous solution.

Any of the reactors employed for heterogeneous catalyzed gas-phase reactions are appropriate for the denitrogenizing reaction if their design allows high volumetric flue-gas currents in relation to output. Permissible space velocities (SV) are in the range of 500 to 20,000 and preferably 1,000 and 15,000 liters of gas per hour and liter of catalyst in terms of a gas at 0° C. and 1 bar. Space velocity will be designated as the dimension $h^{-1}$ in what follows for the sake of simplicity. Appropriate reaction temperatures range from approximately 200° to 600° C. and preferably 270° to 430° C. If the temperatures are much higher, the ammonia can oxidize due to the oxygen in the flue gas, removing the ammonia from the reaction along with the nitrogen oxides and allowing the degree of denitrogenization to drop.

Typical examples of the manufacture and use of the catalysts in accordance with the invention will be specified hereinbelow.

The effectiveness of the catalysts with respect to eliminating nitrogen oxides from mixtures of gases that contain, among other substances, oxygen and sulfur oxides is determined by contacting the catalyst with a stream of gas flowing through a tube packed with the catalyst and electrically heated from outside. The mixture of gases is composed of $O_2$: 3% by volume
$H_2O$: 10% by volume
NO: 750 ppm by volume
$NO_2$: 50 ppm by volume
$NH_3$: 800 ppm by volume
$SO_2$: 950 ppm by volume and
$N_2$: to make up 100% by volume.

The concentration of NO and $NO_2$ in the mixture was measured before and after it traveled through the catalyst packing by an appropriated analyzer (chemiluminescence). The level of NO and $NO_2$ converted subsequent to establishment of a stationary state and as defined by the equations $$\text{NO conversion } (C_{NO}) = \frac{c_{NO}^E - c_{NO}^A}{c_{NO}^E} \times 100 \, (\%)$$

-continued
and $$NO_2 \text{ conversion } (C_{NO2}) = \frac{c^E_{NO2} - c^A_{NO2}}{c^E_{NO2}} \times 100 \, (\%)$$

was selected as the measure for the effectiveness of the catalysts in reducing the nitrogen oxides. $c_{NO}$ and $c_{NO2}$ represent the concentrations of NO and $NO_2$, and the superscripts E and A represent the state of the mixture of gases before and after traveling through the catalyst.

The invention will now be described with reference to the following non-limiting examples.

EXAMPLES

Example 1

2 kg of a fraction of crude bentonite with a particle size greater than 50 μm, a cation-exchange capacity of 79 mvals/100 g and a BET surface of 69 m²/g are stirred into 8 liters of an aqueous solution of HCl for 6 hours at 80° C. The HCl level is about 21% of the dry substance. The material is suctioned off and the filter cake thoroughly washed with acidified water (pH 3.5). The resulting acid-activated bentonite has a BET surface of 210 m²/g. The concentration of interlayer cations is 75% lower. 200 g of the resulting product is milled for 30 minutes with 100 g of freshly precipitated Fe(OH)₃ in a ball mill.

The resulting paste is shaped into extrudates with a diameter of 3 mm, dried for 12 hours at 120° C., and calcined for 4 hours at 450° C.

Since the Fe(OH)₃ precipitate is present in a very finely divided and reactive form, the iron obviously inserts itself during the calcination into the layered structure of acid-activated bentonite.

The extrudates are trimmed to a length of 5 mm and subjected to an effectiveness test under the following conditions (SV = 5000 h⁻¹):

| T (°C.) | $C_{NO}$ (%) | $C_{NO2}$ (%) |
|---|---|---|
| 300 | 93 | 100 |
| 350 | 96 | 100 |
| 400 | 92 | 100 |

Example 2

The acid-activated bentonite obtained as described in Example 1 is dried for 15 hours at 120° C. 1 kg of the dry paste is kneaded with 550 ml of water and with 20 g of glycerol, shaped, and dried or calcined as described in Example 1.

200 g of the resulting extrudates are impregnated for 10 minutes at 40° C. in a solution of 100 g of FeSO₄.7 H₂O in 1 liter of water, suctioned out of the excess solution, dried, and calcined again for 4 hours at 450° C. Analysis reveals that 1% iron has been incorporated as a result of the impregnation.

The results of the activity test (SV = 5000 h⁻¹) are as follows:

| T (°C.) | $C_{NO}$ (%) | $C_{NO2}$ (%) |
|---|---|---|
| 300 | 91 | 100 |
| 350 | 97 | 100 |
| 400 | 95 | 100 |

Example 3

A catalyst is prepared as described in the foregoing example, although impregnated in a solution of 208 g of FeSO₄.7 H₂O in 1 liter of water. In this case the amount of incorporated iron was 2%.

The test (SV = 5000 h⁻¹) indicated as follows:

| T (°C.) | $C_{NO}$ (%) | $C_{NO2}$ (%) |
|---|---|---|
| 300 | 93 | 100 |
| 350 | 98 | 100 |
| 400 | 95 | 100 |

Examples 2 and 3 indicate that even very low concentrations of iron result in high activity.

Example 4

200 g of the acid-activated bentonite obtained in accordance with Example 1 are stirred in 2 liters of a solution of 161 g of Fe(NO₃)₃ in 2 liters of water for 48 hours at room temperature. The pH is adjusted to 3 with HNO₃. The material is suctioned out, thoroughly washed with water, and dried overnight at 120° C.

The product is shaped and treated as described in Example 1. The iron content of the catalyst is 3.9%.

The test (SV = 5000 h⁻¹) indicated

| T (°C.) | $C_{NO}$ (%) | $C_{NO2}$ (%) |
|---|---|---|
| 300 | 87 | 100 |
| 350 | 94 | 100 |
| 400 | 91 | 100 |

Reference Example

A catalyst not in accordance with the invention is prepared as described in Example 2, using a SiO₂-Al₂O₃ (8:4) carrier, instead of the acid-activated bentonite. The amount of iron incorporated by the impregnation was, as in Example 2, 1%.

The amounts of NO converted as indicated by the activity test (SV = 5000 h⁻¹) are significantly lower than those resulting from use of the catalyst in accordance with the invention, as is seen from the following:

| T (°C.) | $C_{NO}$ (%) | $C_{NO2}$ (%) |
|---|---|---|
| 300 | 58 | 90 |
| 350 | 82 | 100 |
| 400 | 84 | 100 |

Furthermore, the catalyst not in accordance with the invention proves to be definitely more difficult to shape.

It will be appreciated that the instant specification and claims are set forth by way of illustration and not limitation, and that various modifications and changes may be made without departing from the spirit and scope of the present invention.

What is claimed is:

1. A ferruginous catalyst for decreasing the content of nitrogen oxide in flue gases, comprising an active constituent in the form of a combination of a compound of iron and of an acid aluminosilicate that has a layered structure, wherein the iron compound is included in the layered structure of the aluminosilicate and wherein the catalyst is obtained by an ion-exchange reaction between a solution of the iron compound and the acid aluminosilicate with a layered structure, that still has a sufficient concentration of easily exchangeable cations.

2. A catalyst as claimed in claim 1, wherein the iron compound is a soluble iron salt.

3. A catalyst as claimed in claim 1, wherein the acid aluminosilicate is a smectite.

4. A catalyst as claimed in claim 1, wherein the atomic ratio of the silicon in the acid aluminosilicate to the iron ranges from 0.07 to 90.

5. A catalyst as claimed in claim 1, wherein the atomic ratio of the silicon in the acid aluminosilicate to the iron ranges from 2 to 50.

6. A catalyst as claimed in claim 1, wherein the acid aluminosilicate is obtained by treating a starting material that contains layered silicate with an aqueous mineral acid, while decreasing the content of intermediate-layer cations.

7. A catalyst as claimed in claim 1, wherein the acid aluminosilicate is an acid activated three-layer silicate that partly retains its crystalline layered structure and has a BET surface that is increased by at least 15% beyond that of the three-layer silicate before acid activation, the three-layer silicate having a cation-exchange capacity of 30 mval/100 g or more before acid activation.

8. A catalyst as claimed in claim 7, wherein the BET surface is increased by at least 50% beyond that of the three-layer silicate before acid activation.

9. A catalyst as claimed in claim 1, wherein the concentration of intermediate-layer cations that results from acid activation is at least 12% lower than that in the three-layer silicate before acid activation.

10. A catalyst as claimed in claim 1, wherein the content of $SiO_2$ is at least 5% higher than that of the starting material.

11. A catalyst as claimed in claim 1, wherein the content of $SiO_2$ is at least 10% higher than that of the starting materials.

12. A catalyst as claimed in claim 1, wherein the percentage of pore volume devoted to macropores with a diameter greater than 80 nm is at least 25%.

13. A catalyst as claimed in claim 1, wherein the catalyst is in the form of a molded shape selected from the group consisting of balls, tablets, extruded shapes, elongated honeycombs, flat honeycombs, rods, tubes, rings, wagon wheels and saddles.

14. A catalyst as claimed in claim 13, wherein the molded shapes are obtained by tableting or extrusion, with or without additives also being mixed to facilitate shaping and to improve mechanical strength or surface structure.

15. A catalyst as claimed in claim 1, wherein the catalyst is obtained by impregnating the acid aluminosilicate with a solution of the iron compound, removing the moiety not incorporated in the silicate lattice by washing and subsequent calcination.

16. A catalyst as claimed in claim 3, wherein the smectite is montmorillonite.

17. A catalyst as claimed in claim 1, wherein the iron compound is iron sulfate.

* * * * *